United States Patent [19]

Patel et al.

[11] Patent Number: 4,997,881

[45] Date of Patent: Mar. 5, 1991

[54] POLY(ALKYL VINYL ETHER)POLYOLEFIN COPOLYMERS

[75] Inventors: Niranjan Patel; Judy S. Riffle; James E. McGrath, all of Blacksburg, Va.

[73] Assignee: Virginia Tech Intellectual Properties, Inc., Blacksburg, Va.

[21] Appl. No.: 418,366

[22] Filed: Oct. 6, 1989

[51] Int. Cl.$^5$ .................. C08L 23/04; C08L 23/10; C08L 51/08; C08L 53/00
[52] U.S. Cl. ............................. 525/63; 525/69; 525/90; 525/91; 525/198; 525/231
[58] Field of Search .................. 525/231, 198, 63, 69, 525/90, 91

[56] References Cited

U.S. PATENT DOCUMENTS

| | | | |
|---|---|---|---|
| 3,121,070 | 2/1964 | Coover et al. | 525/227 |
| 3,144,430 | 8/1964 | Schaffhausen | 525/231 |
| 3,153,680 | 10/1964 | Giustiniani et al. | 525/231 |
| 3,497,574 | 2/1970 | Press | 525/231 |

Primary Examiner—Carman J. Seccuro
Attorney, Agent, or Firm—Richard P. Fennelly; Louis A. Morris

[57] ABSTRACT

A blend of a polyolefin and a poly(alkyl vinyl ether) can be blended at elevated temperature to form a copolymer of the polyolefin and poly(alkyl vinyl ether). The resulting composition is useful as a compatibilizer, as a more water permeable substrate than the polyolefin, and as a photo-degradable material.

6 Claims, 3 Drawing Sheets

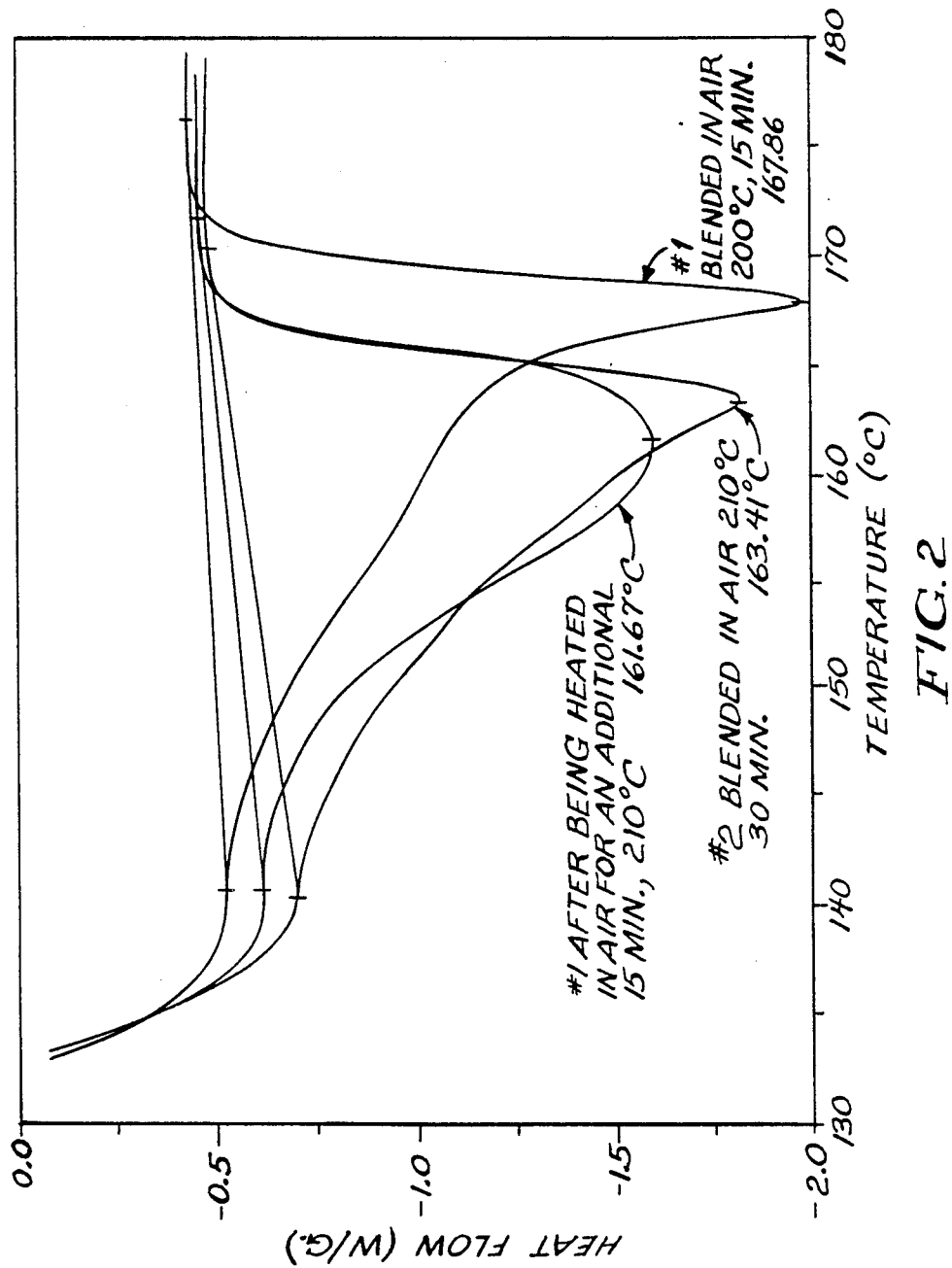

POLY(ALKYL VINYL ETHER)POLYOLEFIN COPOLYMERS

BACKGROUND OF THE INVENTION

Blends of poly(alkyl vinyl ethers) with various polymers, e.g., polystyrene, have been reported J. Hu et al., for example, in Polymer Preprints 29(1), June 1988, pp. 321-322 reported that poly(methyl vinyl ether) was miscible with such polymers as polystyrene, poly(vinyl phenol), phenoxy polymers, and poly(ethylene-co-methacrylic acid) but was immiscible with amorphous polyurethane. Apparently blends of poly(alkyl vinyl ethers) with polyolefins (e.g., polypropylene, polyethylene) have not been reported nor has reactive processing of such blends been performed.

SUMMARY OF THE INVENTION

The instant invention relates to novel poly(alkyl vinyl ether)/polyolefin copolymers and reactive processing of blends of a poly(alkyl vinyl ether) and polyolefin to form them.

DESCRIPTION OF THE DRAWING

The Drawings form a portion of the instant application wherein:

FIG. 2 is another melting point depression plot analogous to those of FIG. 1a and FIG. 1b

DESCRIPTION OF THE INVENTION

It has been found that a blend of a poly(alkyl vinyl ether) and a polyolefin (e.g., polypropylene), which is normally immiscible, can be reactively processed at elevated temperature to form copolymers of the poly(alkyl vinyl ether) and the polyolefin. When a minor amount (e.g., from about 0.5% to about 49%, by weight of the entire blend) of the poly(alkyl vinyl ether) is reacted with a polypropylene, for example, in this manner, the resulting blend becomes compatible. Such a blend can find a variety of uses as will be described in greater detail below.

The poly(alkyl vinyl ether) component to which the instant invention pertains includes those having the repeating unit

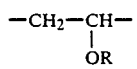

where R is lower straight or branched chain alkyl, such as methyl, ethyl, propyl, butyl, and the like or branched structures thereof (isopropyl, isobutyl, and the like).

Polyolefins which can be used herein include polypropylene.

The reactive processing involves heat blending the two aforesaid polymers at a sufficiently high temperature (e.g., about 210° C. or greater) with or without a free radical catalyst below their thermal decomposition point for a sufficient length of time (e.g., about fifteen minutes or greater) to achieve copolymerization between the poly(alkyl vinyl ether) and polyolefin.

The invention is further understood by reference to the Examples which follow.

COMPARATIVE EXAMPLE 1

Isotactic polypropylene (90 parts by weight) was blended with 10 weight percent poly(methyl vinyl ether) in a an air atmosphere at 200° C. for fifteen minutes. Differential scanning calorimetry showed that the melting point of the resulting blend was substantially identical (within experimental error) to the melting point of the isotactic polypropylene homopolymer indicating that the blend was immiscible.

EXAMPLE 2

This Example repeated the blending procedure of Comparative Example 1 at a temperature of 210° C. for a period of thirty minutes. Differential scanning calorimetry indicated that the melting point of the blend was depressed approximately 5° C. thereby indicating that the two polymers had reacted under the blending conditions to form a graft copolymer.

Figure 1A:
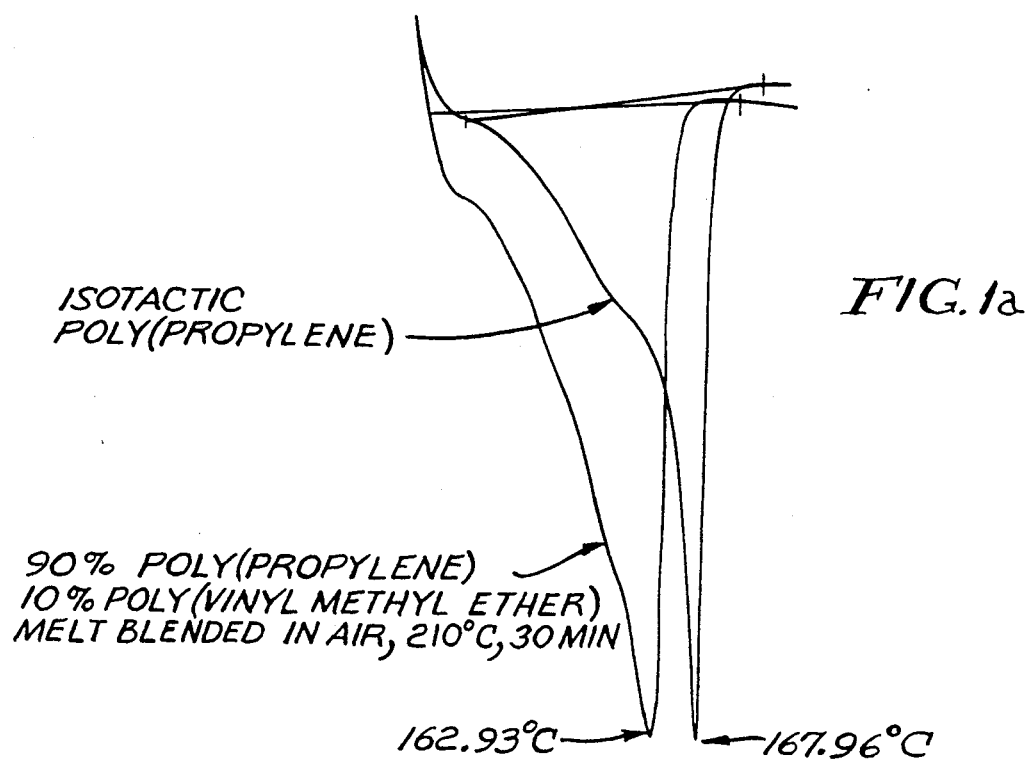
FIG. 1a and 1b are melting point depression plots of polypropylene and blends of polypropylene and poly(methyl vinyl ether)
Figure 1B:
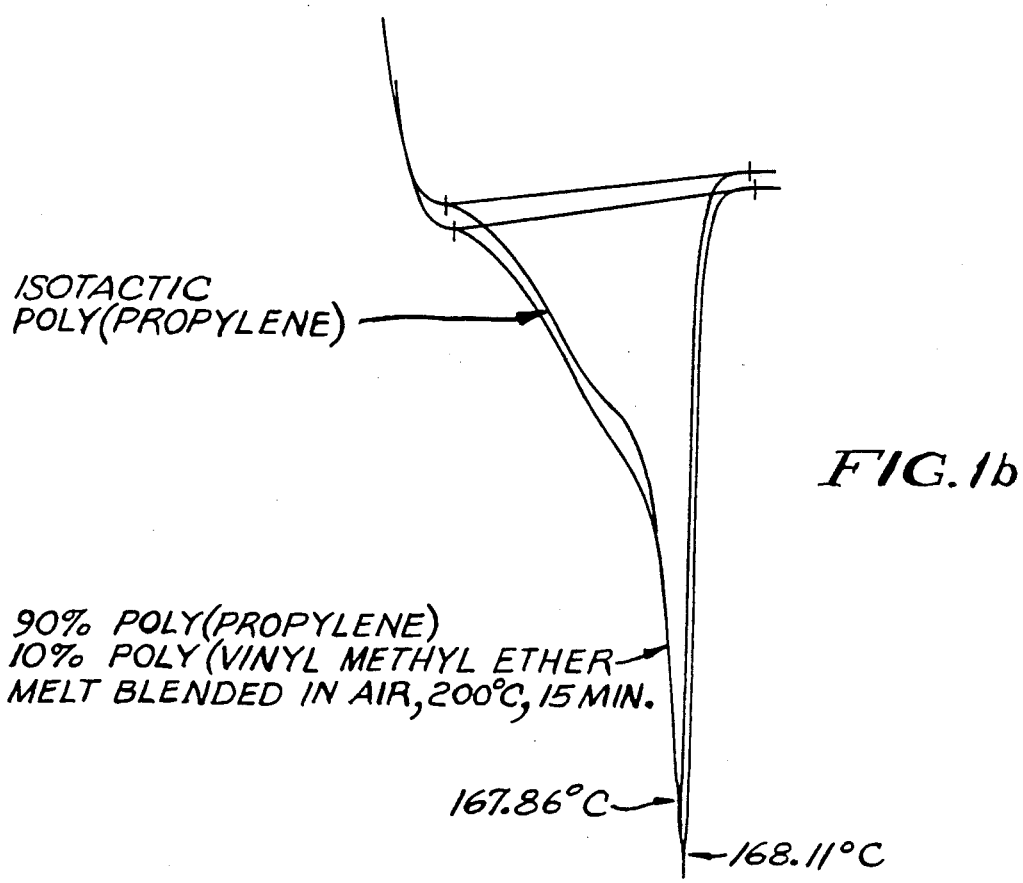

The results of Comparative Example 1 and Example 2 are shown in FIGS. 1a and 1b.

EXAMPLE 3

The immiscible blend produced in Comparative Example 1 was heat treated at 210° C. for fifteen minutes. Differential scanning calorimetry showed a melting point depression of approximately 6° C. from the original melting point of the polypropylene. FIG. 2 shows these results along with a second run in accordance with Example 2.

EXAMPLE 4

Figure 3:
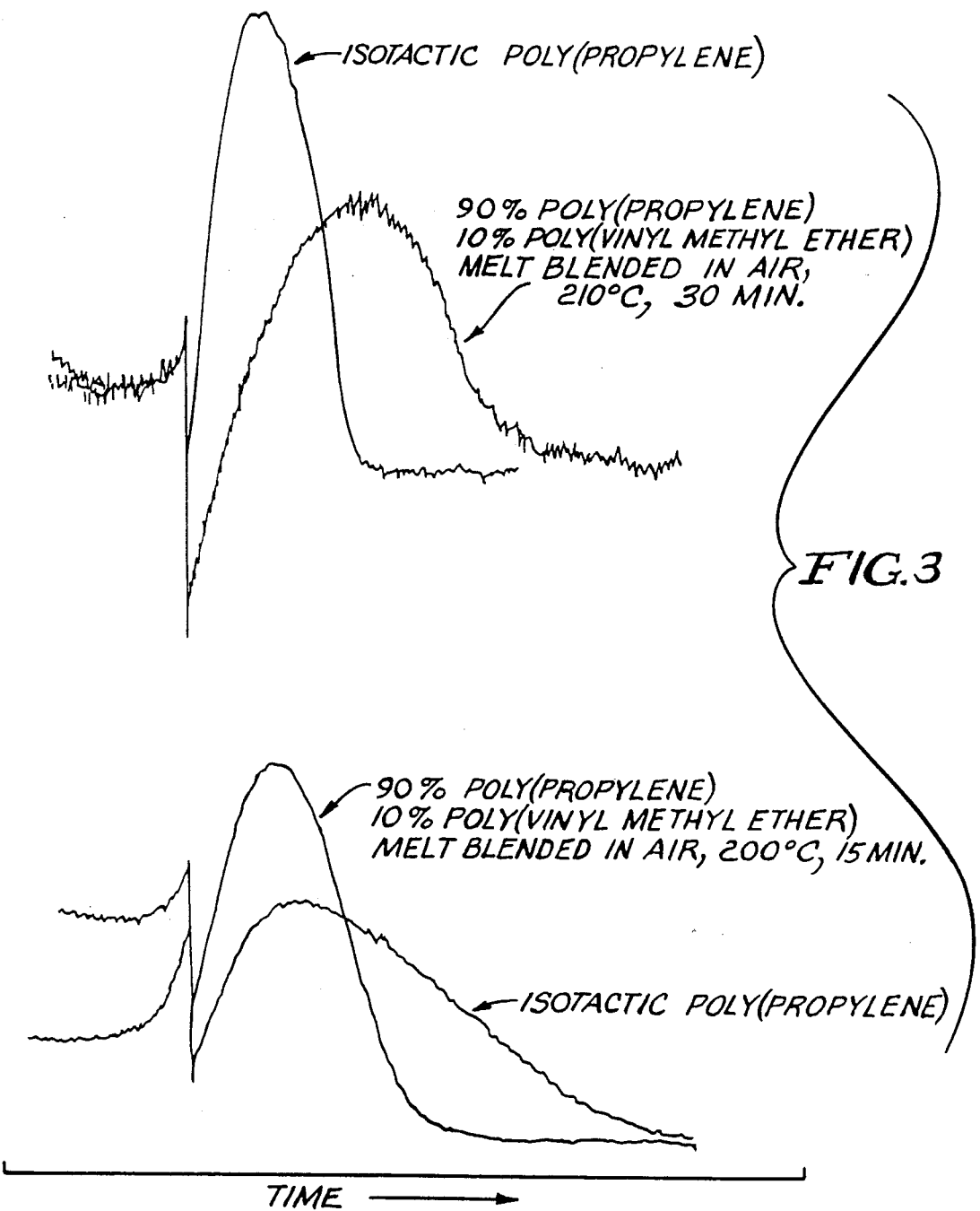
FIG. 3 is a plot of the isothermal crystallization rates for polypropylene and certain polypropylene/poly(ethyl vinyl ether) blends processed under differing conditions.

The isothermal crystallization rates of polypropylene homopolymer as compared to the ungrafted, immiscible blend of Comparative Example 1 and the grafted, at least partially miscible blend of Example 2, was monitored at several temperatures as shown in FIG. 3. The blend prepared in an air atmosphere at 200° C. for fifteen minutes (the lower portion of FIG. 3) showed a faster crystallization rate than polypropylene homopolymer indicating that a second immiscible phase existed at the crystallization temperature (130° C.). By contrast, the polymer blend prepared in air atmosphere at 210° C. for thirty minutes showed a slower crystallization rate (upper portion of FIG. 3) indicating that nucleation by a second phase was not significant in such a blend and that the growth rate is slowed by the necessity for exclusion of the miscible polypropylene/poly(methyl vinyl ether) component from the blend as the polypropylene crystallizes which is also evidence of some degree of miscibility in this system.

Since the poly(methyl vinyl ether), for example, is hydroscopic and the polypropylene is hydrophobic, the hydrophilic/lipophilic balance of the resulting material can be controlled by adjustment of the relative proportions of each which are combined and treated. Enhanced adhesive properties of the polyolefin to hydrophilic substrates can be imparted in this manner.

The blend in accordance with the instant invention also functions as a compatibilizer so that other hydrophilic components or particles (e.g., dye molecules or hydrophilic filler materials) can be well dispersed in the otherwise hydrophobic polyolefin matrix.

Water vapor permeability can also be controlled for the blend. This can allow for control of water vapor permeability through various materials and can have importance for applications such as disposable outer layers for diapers where water permeability for a nonporous polyolefin is highly desirable.

An alternative embodiment of the invention involves preparation of block or graft copolymers comprised of the poly(alkyl vinyl ether) with another polymer structure in the copolymer. For example, a poly(alkyl vinyl ether)/polyoxazoline block or graft copolymer or a poly(alkyl vinyl ether)/poly(alkyl methacrylate) block or graft copolymer might be formed initially with the subsequent grafting of this onto the polyolefin through the poly(alkyl vinyl ether) component and the reactive processing step described herein. This composition can then be blended with other homopolymers compatible with the polyoxazoline or poly(alkyl methacrylate) components, for example. By varying the structure of the second component in the poly(alkyl vinyl ether) copolymer, this method provides a route to compatibilization of a wider range of polymeric materials with polyolefins.

Another important feature of the present grafting reaction of the poly(alkyl vinyl ether) onto the polyolefin (e.g., polypropylene) is that a significant level of ketone groups are formed in the reaction processing step which render the resulting modified polyolefin composition photodegradable.

The foregoing illustrate certain embodiments of the present invention but should not be considered in a limiting sense. The scope of protection sought is set forth in the claims which follow.

We claim:

1. A reacted polymer blend of a polyolefin and a poly(alkyl vinyl ether) component which is a block or graft copolymer comprising poly(alkyl vinyl ether and polyoxazoline, said reacted blend being prepared by mixing the polymers at an elevated temperature.

2. A reacted polymer blend as claimed in claim 1 wherein the poly(alkyl vinyl ether) component comprises a minor amount of the copolymer.

3. A reacted polymer blend as claimed in claim 2 wherein the minor amount comprises up to about 49% by weight).

4. A reacted polymer blend as claimed in claim 1 wherein the polyolefin is polypropylene.

5. A reacted polymer blend as claimed in claim 1 wherein the poly(alkyl vinyl ether) is poly(methyl vinyl ether).

6. A process of forming the reacted polymer blend of claim 1 which comprises heat blending the polyolefin and the poly(alkyl vinyl ether).

* * * * *